M. A. FRINE.
WIND SHIELD AND TOP SUPPORT.
APPLICATION FILED NOV. 3, 1917.
1,307,627.
Patented June 24, 1919.
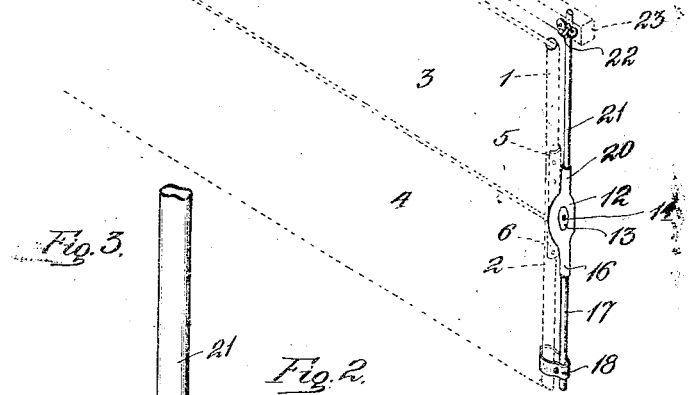
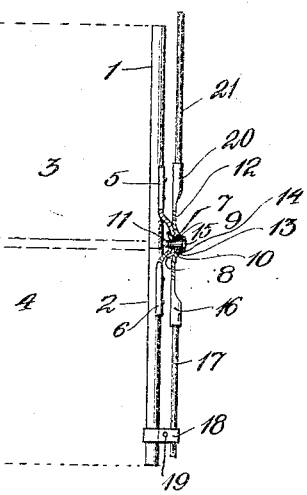
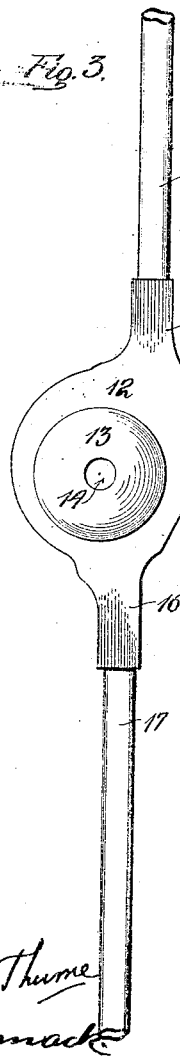
Witnesses:
Roland H. Thume
Otto Wannack
Inventor:
Michael A. Frine
by Anton Gluck
Atty

UNITED STATES PATENT OFFICE.

MICHAEL A. FRINE, OF LOS ANGELES, CALIFORNIA.

WIND-SHIELD AND TOP SUPPORT.

1,307,627.      Specification of Letters Patent.      Patented June 24, 1919.

Application filed November 3, 1917. Serial No. 200,205.

*To all whom it may concern:*

Be it known that I, MICHAEL A. FRINE, a citizen of the United States, residing at Los Angeles, county of Los Angeles, and State of California, have invented a certain new and useful Improvement in Wind-Shield and Top Supports, of which the following is a specification.

My invention relates to an attachment for motor cars, and has especial reference to a device readily and conveniently applied to the frame of a wind shield to support the same rigidly and insure the glass against breakage and cracks incident to excessive strain and vibration communicated from the car body to the frame of the wind shield.

The objects of this invention are to provide a simple, neat and inexpensive device which will securely hold the wind shield frame and at the same time form a convenient and solid support for the forward end of a top of the class known as the "one man top."

These and other objects are attained by a form of device represented in the accompanying drawing, and particularly described in the subjoined specification.

In the drawing,

Figure 1 is a perspective view of my invention showing it as applied to a wind shield and as supporting the cross member of the forward end of the top.

Fig. 2 is a front view partly in section, and

Fig. 3 is a plan view of the device.

The wind shield consists, in this instance, usually of two frames 1 and 2, each carrying a glass 3 and 4, respectively. On the outside of each frame 1 and 2 is riveted or otherwise secured, a member 5 and 6, respectively, bowed outwardly and formed with outwardly pressed spherical surfaces 7 and 8, respectively, having central openings 9 and 10, respectively, constituting bearings for a pin 11 on the frame 1.

The two outwardly pressed surfaces 7 and 8, interfit to hold frictionally the frame 1 in normal position or in any position of adjustment.

Ordinarily the lower frame 2, is rigidly fixed or attached to the car body, and the distortion and strains of the same during travel are communicated to the frame, resulting frequently in the breakage of the glass.

My invention is directed to a means for making the lower frame solid in itself and preventing the transfer of any body distortion thereto, and comprises a plate 12 having an outwardly pressed spherical surface 13 arranged to fit over the surface 8, and provided with a central orifice 14, through which the pin 11 extends and onto which pin is screwed a nut 15 to hold the plate 12 in assembled relation with the surface 8.

The bottom of said plate 12 is formed with a tubular portion 16, in which is fastened in any desirable manner a rod 17, extending downwardly approximately in parallel alinement with the frame 2, such rod being firmly connected with the lower part of said frame by a U-shaped clamp 18, which is tightened upon the rod 17 and frame 2, simultaneously, by a nut 19 on the end of a bolt which passes approximately centrally through both branches of the U-shaped clamp and between the rod and frame.

The top of the plate 12 is formed with an upwardly directed tubular portion 20 in which is fastened in any desirable manner a rod 21 extending upwardly and laterally of the frame 1.

The axis of both tubular portion 20 and rod 21 is offset with respect to the lower tubular portion 16 and rod 17, such provision being made to bring such rod 21 forwardly of the frame 1, whereby to enable the end thereof to pass through and be secured, as by a winged bolt 22, to the cross piece 23, by which the front of the top is supported.

What I claim, is:—

An attachment for wind shield frames comprising upper and lower overlapping members provided with apertures on a line central with the adjoining edges of the shields, a pin on the upper frame extended through the apertures of said members for pivoting the same, a plate provided with an aperture through which said pin is extended, said plate formed with a downwardly extended rod and an upwardly extended offset rod, means for fastening said downwardly extended rod directly to the lower frame, and means for fastening the upwardly extended rod to the top of an automobile.

In testimony whereof I affix my signature in the presence of two witnesses.

MICHAEL A. FRINE.

Witnesses:
 HENRY E. STORRS,
 ROLAND H. THURNER.